United States Patent
Koyama et al.

(10) Patent No.: US 8,490,501 B2
(45) Date of Patent: Jul. 23, 2013

(54) COMPLEX SENSOR AND ROBOT HAND (75) Inventors: Junji Koyama, Azumino (JP); Makoto Shimojo, Chofu (JP); Yoshitomo Mizoguchi, Chofu (JP)

(73) Assignee: Harmonic Drive Systems Inc., Tokyo (JP)

( * ) Notice: Subject to any disclaimer, the term of this patent is extended or adjusted under 35 U.S.C. 154(b) by 285 days.

(21) Appl. No.: 12/992,757

(22) PCT Filed: May 29, 2008

(86) PCT No.: PCT/JP2008/001355
§ 371 (c)(1),
(2), (4) Date: Nov. 15, 2010

(87) PCT Pub. No.: WO2009/144767
PCT Pub. Date: Dec. 3, 2009

(65) Prior Publication Data
US 2011/0067504 A1 Mar. 24, 2011

(51) Int. Cl.
*G01L 1/00* (2006.01)

(52) U.S. Cl.
USPC .................................................. 73/862.381

(58) Field of Classification Search
USPC .................................................. 73/862.381
See application file for complete search history.

(56) References Cited

U.S. PATENT DOCUMENTS

| | | | |
|---|---|---|---|
| 5,010,774 A * | 4/1991 | Kikuo et al. | 73/862.046 |
| 5,962,118 A * | 10/1999 | Burgess | 428/308.4 |
| 6,499,351 B1 | 12/2002 | Enomoto et al. | |
| 7,984,658 B2 * | 7/2011 | Kishida et al. | 73/862.391 |
| 2009/0183577 A1 | 7/2009 | Shimojo | |
| 2009/0200815 A1 * | 8/2009 | Sugahara et al. | 294/106 |

FOREIGN PATENT DOCUMENTS

| | | |
|---|---|---|
| JP | 56-147003 A | 11/1981 |
| JP | 60-062496 A | 4/1985 |
| JP | 60-035602 B2 | 8/1985 |
| JP | 60-037401 B2 | 8/1985 |

(Continued)

OTHER PUBLICATIONS

*International Search Report (PCT/ISA/210) issued on Jun. 24, 2008, by Japanese Patent Office as the International Searching Authority for International Application No. PCT/JP2008/001355.

*Primary Examiner* — Lisa Caputo
*Assistant Examiner* — Octavia Davis-Hollington
(74) *Attorney, Agent, or Firm* — Buchanan Ingersoll & Rooney PC (57) ABSTRACT

A complex sensor comprises a touch sensor and a proximity sensor. The touch sensor comprises a flexible pressure-sensitive sheet covering a fingertip portion. The pressure-sensitive sheet comprises a front surface film and a rear surface film composed of a flexible conductive material, an intermediate film which is sandwiched between the films in a state in which the intermediate film is electrically connected and which is composed of pressure-sensitive conductive rubber, and first to fourth electrode terminals formed on the front surface and rear surface films. The size of a load acting on the pressure-sensitive sheet and the center position of the load can be detected based on the terminal voltage. A through-hole is formed in the pressure-sensitive sheet such that the sensing surface of the proximity sensor is exposed, thus the approach of a holding object can be detected.

24 Claims, 7 Drawing Sheets

FOREIGN PATENT DOCUMENTS

| | | |
|---|---|---|
| JP | 63-238502 A | 10/1988 |
| JP | 5-060631 A | 3/1993 |
| JP | 6-005162 B | 1/1994 |
| JP | 6-058239 | 8/1994 |
| JP | 2000-283866 A | 10/2000 |
| JP | 2002-326554 A | 11/2002 |
| JP | 2006-064408 A | 3/2006 |
| JP | WO 2007/069412 A1 | 6/2007 |

\* cited by examiner

COMPLEX SENSOR AND ROBOT HAND

TECHNICAL FIELD

The present invention relates to a complex sensor provided with a plurality of sensors that include a touch sensor, and particularly relates to a complex sensor that is appropriate for attachment to a fingertip surface of a robot hand for performing object-grasping operations and the like. The present invention also relates to a robot hand provided with the complex sensor.

BACKGROUND ART

Vision functions for ascertaining the position of an object to be grasped and touch functions for ascertaining that the object to be grasped has been grasped are necessary in a robot hand for grasping objects. Vision and touch are complementary senses. Vision estimates the global condition, and touch ascertains the local condition. Complex sensors for imparting vision and touch functions to a robot hand are disclosed in the following patent documents.

In Patent Document 1 (JP-A 60-62496) there is disclosed a touch sensor combining sensing of contact, pressure, and proximity. The touch sensor disclosed therein has an optically transparent flexible plate-shaped part; a light-receiving part that is sensitive only to light from a front surface provided to a surface of the flexible plate-shaped part; and a light-emitting part for irradiating the flexible plate-shaped part from a rear surface of the light-receiving part, wherein reflected light that is emitted from the light-emitting part and reflected off an object of measurement is received by the light-receiving part; and the approach of the object of measurement to the plate-shaped part, the contact of the object of measurement with the plate-shaped part, and the pressure at the time of contact can be detected by the strength of the light received by the light-receiving part.

Disclosed in Patent Document 2 (JP-A 63-238502) is a proximity and touch sensor that is attached to a surface of a manipulator of a robot, whereby the approach of the manipulator to within, e.g., 20 cm of an obstacle or other object, and the contact of the manipulator with the object can be detected. In the proximity and touch sensor disclosed herein, electrodes are attached to both surfaces of a sheet-form pressure-sensitive conductive rubber; the capacitance to ground of the pressure-sensitive conductive rubber is measured, whereby proximity of the object is detected; and the electrical resistance of the pressure-sensitive conductive rubber is measured, whereby contact with the object is detected.

On the other hand, touch sensors that are capable of detecting the magnitude of a load acting on a detection surface, and the center position (position of the center of gravity) of the load acting on the detection surface have been proposed by one of the inventors of the present application. Specifically, in Patent Document 3 (JP-B 60-35602) there is proposed a method for detecting surface pressure data for detecting the magnitude of a load acting on a detection surface and the two-dimensional position of the center of gravity of the load. In Patent Document 4 (JP-B 06-58239) is proposed a sliding sensor that is capable of using a sheet-form touch sensor to detect sliding. In Patent Document 5 (WO2007/069412) there is proposed a sensor for detecting the center position of a two-dimensionally distributed load, where the sensor is composed of a flexible sheet.

[Patent Document 1] JP-A 60-62496
[Patent Document 2] JP-A 63-238502
[Patent Document 3] JP-B 60-35602
[Patent Document 4] JP-B 06-58239
[Patent Document 5] WO 2007/069412

DISCLOSURE OF THE INVENTION

Problems to be Solved by the Invention

When acting as complex sensors for providing vision and touch functions to a robot hand or the like, an optically transparent flexible member must be used when using the sensor disclosed in Patent Document 1, and the capacitance of a pressure-sensitive conductive rubber must be measured when using the sensor disclosed in Patent Document 2.

It is an object of the present invention to propose a complex sensor that can detect proximity and contact of an object using a configuration that is simpler than conventional complex sensors.

It is also an object of the present invention to propose a complex sensor that can detect properties of an object and contact with the object using a configuration that is simpler than conventional complex sensors.

It is a further object of the present invention to propose a complex sensor that can detect the proximity and contact position of an object in a simple structure using the sheet-form touch sensor that was proposed by one of the inventors of the present application and that can detect the magnitude of a load acting on a detection surface, and the position of the center of gravity of the load acting on the detection surface.

It is also an object of the present invention to propose a robot hand provided with a new complex sensor.

Means Used to Solve the Above-Mentioned Problems

In order to solve the aforementioned problems, a complex sensor of the present invention comprises a sensor-mounting component provided with a detection surface; a touch sensor mounted on the sensor-mounting component and provided with a pressure-sensitive sheet for detecting contact of an object with the detection surface of the sensor-mounting component; and an auxiliary sensor mounted on the sensor-mounting component, characterized in that the detection surface is delimited by a surface of the pressure-sensitive sheet of the touch sensor, a sheet-removal part formed by cutting through a part of the pressure-sensitive sheet in a thickness direction, and a sensing surface of the auxiliary sensor, the sensing surface being exposed via the sheet-removal part.

In the complex sensor of the present invention, the detection surface is delimited by a surface of the pressure-sensitive sheet of the touch sensor and a sensing surface of the auxiliary sensor, the sensing surface being exposed via the sheet-removal part formed in the pressure-sensitive sheet. The auxiliary sensor can be used to detect, e.g., the approach of an object to the detection surface, or properties of the approaching object. The touch sensor can be used to detect contact of the object with the detection surface.

The pressure-sensitive sheet of the touch sensor employed in the complex sensor of the present invention comprises a front surface film comprising a flexible, electrically conductive material; a rear surface film comprising a flexible, electrically conductive material; an intermediate film sandwiched between the front surface film and the rear surface film in an electrically conductive state and comprising a flexible, pressure-sensitive, electrically conducting material, conductance characteristics thereof changing according to a magnitude of a load applied in the thickness direction; a first electrode terminal and a second electrode terminal formed on both ends of the front surface film in a planar direction; and a third electrode terminal and a fourth electrode terminal formed on both ends of the rear surface film in the planar direction, characterized in that at least one of the magnitude of the load applied to the detection surface and a position of a center of gravity of the load can be detected on the basis of a terminal voltage obtained from the first through fourth electrode terminals in a state in which a predetermined difference in electrical potential is maintained between the front surface film and the rear surface film sandwiching the intermediate film.

It was confirmed that the decrease in detection accuracy of the touch sensor due to the sheet-removal part formed in the pressure-sensitive sheet is minor. A simple structure in which a through hole or other sheet-removal part is formed in the pressure-sensitive sheet can therefore be used to allow a complex sensor to be built and to allow the magnitude and center of gravity of the load of an object acting on the detection surface to be accurately detected using the touch sensor.

In the complex sensor of the present invention, the auxiliary sensor is characterized in being a proximity sensor for detecting proximity of the object to the detection surface of the sensor-mounting component. The proximity sensor used may be an optical sensor, ultrasound sensor, or the like.

The auxiliary sensor may instead be a sensor for detecting optical characteristics, temperature characteristics, or other physical characteristics of an object in proximity to the detection surface or an object in contact with the detection surface. A touch sensor may also be used as the auxiliary sensor.

In the complex sensor of the present invention, the sheet-removal part may be a through hole formed in the pressure-sensitive sheet. The shape of the through hole is generally circular but may also be triangular, square, another polygonal shape, or another desired shape.

A second sheet-removal part may be formed on the pressure-sensitive sheet in a position different from the sheet-removal part, characterized in that a region other than the sensing surface of the auxiliary sensor is exposed via the second sheet-removal part. For example, a surface portion of the sensor-mounting component covered by the pressure-sensitive sheet may be exposed, and a screw or other fastening component can be attached to the surface portion. In this way, e.g., the fastening component can be accessed and attached, removed, or the like without the pressure-sensitive sheet being removed.

In the complex sensor of the present invention, another configuration is possible, comprising a plurality of auxiliary sensors of the same type or different types, the plurality of auxiliary sensors acting as the auxiliary sensor, characterized in that the sheet-removal part is formed in a plurality of locations in the pressure-sensitive sheet; and each of the sheet-removal parts exposes the sensing surface of one or a plurality of the auxiliary sensors.

If, e.g., the respective sensing surfaces of optical proximity sensors acting as the auxiliary sensor are positioned so as to be exposed via the sheet-removal parts, proximity of the object can be detected at various regions on the detection surface. Proximity of the object and, e.g., the temperature of the approaching object can be detected if the sensing surface of the optical proximity sensor is exposed via a part of the sheet-removal part, and the sensing surface of a temperature sensor is exposed via the remainder of the sheet-removal part.

The present invention is also a robot hand, comprising a finger mechanism provided with an object-grasping surface; and the complex sensor having the aforedescribed configuration, characterized in that at least a part of the object-grasping surface is delimited by the detection surface of the complex sensor.

In the robot hand of the present invention, the detection surface of the object-grasping surface is used to detect the degree of proximity of an object to be grasped, as well as to detect contact with the object. The object to be grasped can therefore be grasped without accompanying impact, and a robot hand can be implemented to be capable of grasping pliable objects and eggs or other readily damaged objects without causing deformation or damage.

In cases in which the finger mechanism of this robot hand comprises a finger-base part and a fingertip part, the fingertip part being linked to a distal end of the finger-base part via a joint part, a fingertip surface portion of the fingertip part is at least the object-grasping surface; and the fingertip surface portion is the detection surface of the aforedescribed complex sensor.

The present invention is also a robot, comprising an arm, the arm being provided with an object-detecting surface; and the complex sensor of the aforedescribed configuration, characterized in that at least a part of the object-detecting surface of the arm is delimited by the detection surface of the complex sensor.

In the robot of the present invention, proximity and contact of an object in relation to the arm are detected using the detection surface of the object-detecting surface. The arm of the robot can therefore, e.g., perform operations for moving an object positioned in the vicinity without causing impact.

Effect of the Invention

The complex sensor of the present invention employs a configuration in which a through hole or other sheet-removal part is formed in a part of the sensing surface of a touch sensor, and the sensing surface of a proximity sensor or other auxiliary sensor is exposed via the sheet-removal part. A simple configuration can therefore be used to implement a complex sensor that is capable of detecting proximity of an objected, attributes of the object, and contact with the object.

In particular, proximity of the object and attributes of the approaching object can be detected, and the contact position of the object can be accurately detected when the touch sensor used is a sheet-form touch sensor proposed by one of the inventors of present application, where this touch sensor can detect the magnitude and center of gravity of a load. The present invention is therefore applicable for use in imparting vision and touch functions of a robot hand for performing object-grasping operations.

BEST MODE FOR CARRYING OUT THE INVENTION

Embodiments of a robot hand provided with a complex sensor in which the present invention is applied will be described below with reference to the drawings.

Embodiment 1

Figure 1:
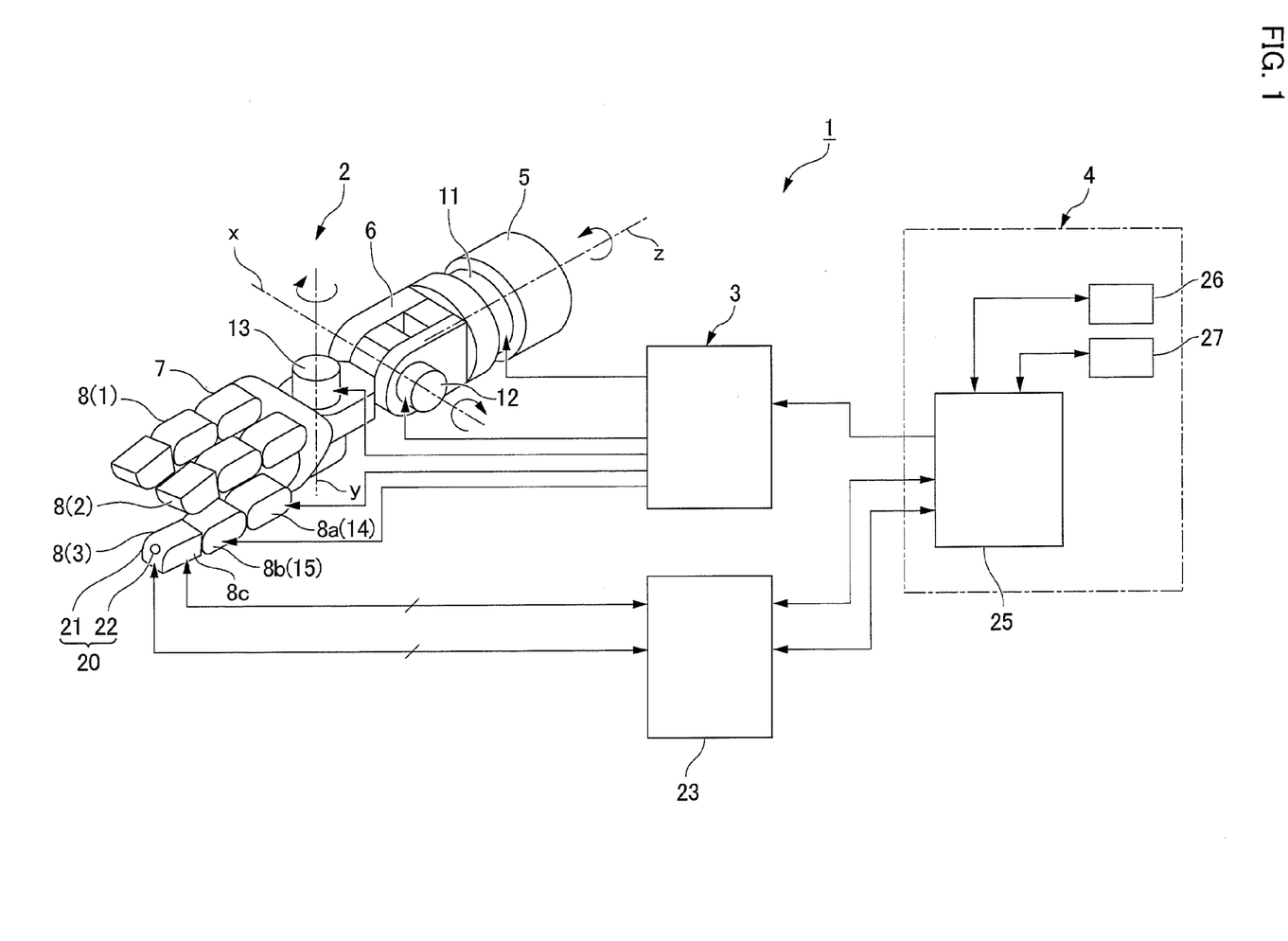
FIG. 1 is a schematic configuration diagram of a robot-hand system in which the present invention is applied.

FIG. 1 is a schematic configuration diagram that shows a robot-hand system according to Embodiment 1. A robot-hand system 1 has a robot hand 2, a driver 3 for driving the robot hand 2, and a control device 4 for controlling the driving of the robot hand 2 via the driver 3. The robot hand 2 is provided with an arm part 5, a triple-axle arm-joint part 6 that is attached to the distal-end part of the arm part 5, and a hand part 7 attached to the distal end of the arm-joint part 6. The hand part 7 is provided with three finger mechanisms 8(1), 8(2), 8(3) that have identical structures. The finger mechanisms 8(1) through 8(3) have two joints and are provided with a basal finger part 8a, a middle finger part 8b, and a fingertip part 8c.

The triple-axle arm-joint part 6 is provided with a z-axis actuator 11 for causing the hand part 7 to rotate about the z-axis, an x-axis actuator 12 for causing the hand part 7 to rotate about the x-axis, and a y-axis actuator 13 for causing the hand part 7 to rotate about the y-axis. The finger mechanisms 8 are provided with an actuator 14 for causing the middle finger part 8b to rotate in a direction for grasping and releasing an object and an actuator 15 for causing the fingertip part 8c to rotate in the direction for grasping and releasing an object.

A complex sensor 20 is mounted on each of the fingertip parts 8c (sensor-mounting components) of the three finger mechanisms 8. The complex sensor 20 comprises a touch sensor 21 and a proximity sensor 22 that is composed of a reflective photosensor. The detection signals of the touch sensor 21 and the proximity sensor 22 are fed to the control device 4 via an analog circuit 23 and an A/D converter port (not shown) of the control device 4. The control device 4 is constituted by a computer 25 as a main part. A keyboard 26 or other input device and a display 27 or other output device are connected to the computer 25. A program for controlling the driving of the robot hand is installed in the computer 25 and executed, whereby the driving of the robot hand 2 is controlled, and object-grasping operations can be performed. The proximity of the object, as well as the position and pressure of contact of the object are detected during the object-grasping operation on the basis of the detection signals of the complex sensor 20. The finger mechanisms 8 are driven at an appropriate grasping speed on the basis of this information.

Figure 2:
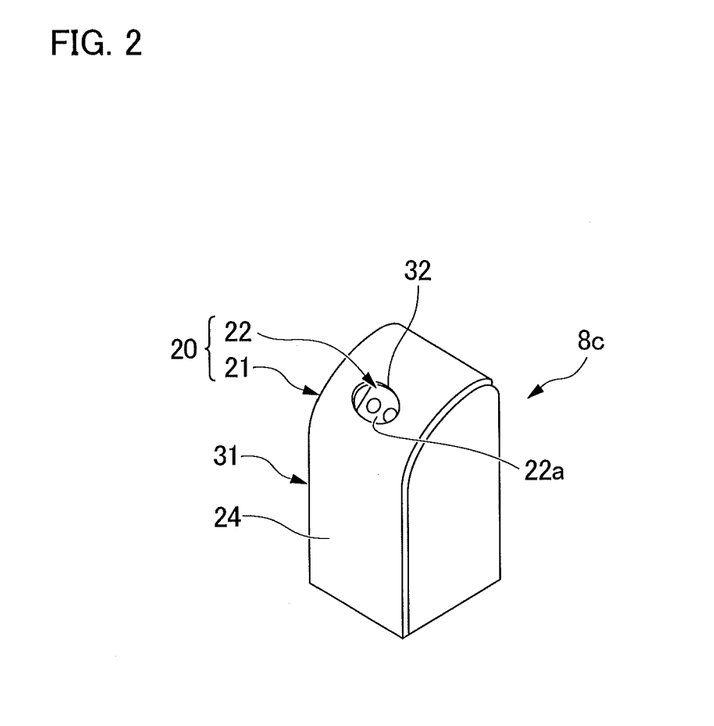
FIG. 2 is a perspective view that shows a complex sensor attached to a fingertip portion of the robot hand of FIG. 1.
Figure 3:
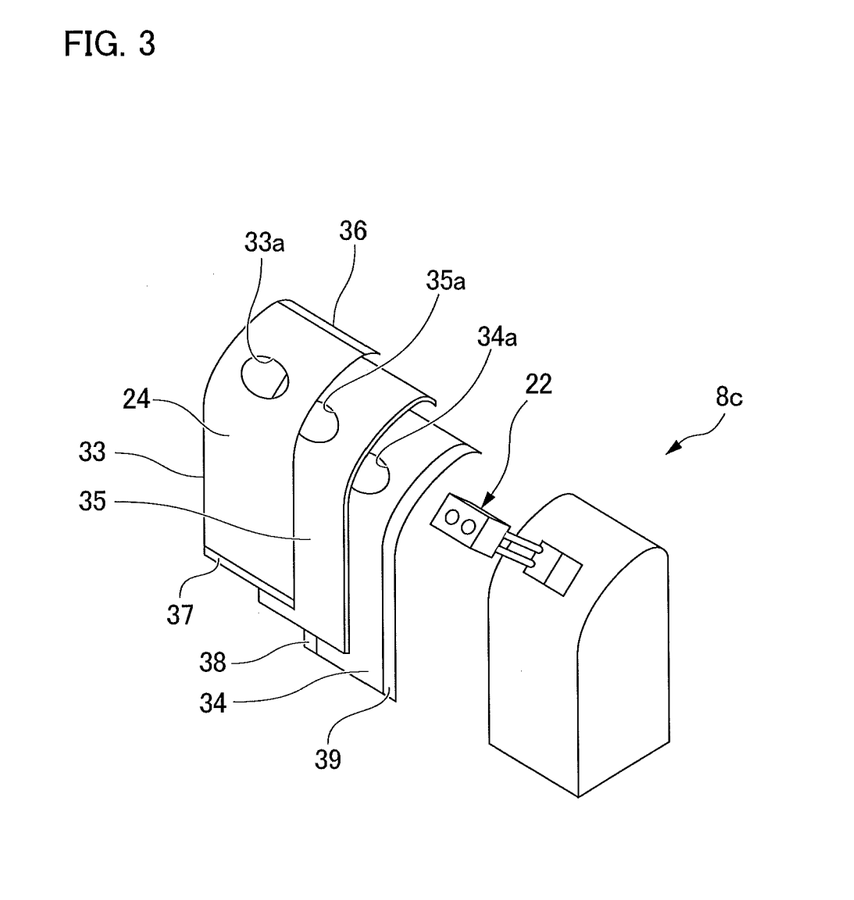
FIG. 3 is an exploded perspective view of the complex sensor of FIG. 2.

FIG. 2 is a partial perspective view that shows the detection portion of the complex sensor 20 that is mounted on the fingertip part 8c of the finger mechanisms 8(1) through 8(3) of the robot hand 2. FIG. 3 is an exploded perspective view of the detection portion of the complex sensor 20 of the fingertip part 8c. The fingertip part 8c corresponds to the fingertip of a human and is the portion that first contacts the object when the robot hand 2 grasps the object.

The surface on the side of fingertip part 8c that contacts the object to be grasped is an object-grasping surface for contacting the object (not shown) and is a detection surface 24. In the present example, this surface is convex, has a constant width, and is bent 90° in an arcuate shape towards the distal side. The detection surface 24 is defined by the surface of a flexible pressure-sensitive sheet 31 of the touch sensor 21. The pressure-sensitive sheet 31 has a rectangular shape and is affixed to the fingertip part 8c so as to be bent into a convex surface along the shape of the surface of the fingertip part 8c. A circular through hole (sheet-removal part) 32 is formed in the pressure-sensitive sheet 31 so as to cut through a part of the pressure-sensitive sheet in the thickness direction. A sensing surface 22a of the proximity sensor 22 that is composed of a reflective photosensor mounted on the fingertip part 8c is exposed via the through hole 32.

The touch sensor 21 detects the center position of a two-dimensional load distribution. As shown in FIG. 3, the pressure-sensitive sheet 31 of the touch sensor is provided with a front surface film 33 that is composed of a flexible, electrically conductive material, a rear surface film 34 that is composed of a flexible, electrically conductive material, and an intermediate film 35 that is sandwiched between the front surface film 33 and the rear surface film 34 in an electrically conducting state and that is composed of a flexible, pressure-sensitive, conductive rubber, in which the conductance characteristics change according to the magnitude of the load acting in the thickness direction. The front surface film 33, the rear surface film 34, and the intermediate film 35 have a rectangular shape and are substantially the same size. Through holes 33a through 35a that constitute the through hole 32 are formed at identical positions in these films 33 through 35. A pair of a first electrode terminal 36 and a second electrode terminal 37 are formed on the upper and lower short-side portions of the front surface film 33. A pair of a third electrode terminal 38 and a fourth electrode terminal 39 are formed on the left and right long-side portions of the rear surface film 34.

When a predetermined voltage is applied between the first and second electrode terminals 36, 37 and between the third and fourth electrode terminals 38, 39 in the touch sensor 21, a current flows through the intermediate film 35 according to the value of the resistance thereof. When a load acts on the pressure-sensitive sheet 31, the intermediate film 35 that is composed of the pressure-sensitive conductive rubber elastically deforms in the thickness direction at the region at which the load is applied, and the resistance value changes according to the magnitude of the load. A current that corresponds to the load applied to the pressure-sensitive sheet 31 therefore flows between the first and second electrode terminals 36, 37 and the third and fourth electrode terminals 38, 39.

The analog circuit 23 applies the predetermined voltage between the first and second electrode terminals 36, 37 and the third and fourth electrode terminals 38, 39, maintains a predetermined difference in potential between the front surface film 33 and the rear surface film 34 sandwiching the intermediate film 35, and extracts the voltage between both ends in the planar direction of the front surface film 33 and the voltage between both ends in the planar direction of the rear surface film 34 that result from changes in the conductance characteristics of the intermediate film 35. The total amount of load acting on the detection surface 24 and the center position (position of the center of gravity) of the load are calculated in the control device 4 on the basis of the terminal voltages of the first through fourth electrode terminals 36 through 39. The center position is expressed as a weighted average that is obtained by weighting the respective positions at which a plurality of loads are applied to the surface of the pressure-sensitive sheet 31 of the touch sensor 21 by their loads.

The control device 4 also detects sliding of an object that is in contact with the detection surface 24 (the surface of the pressure-sensitive sheet 31) on the basis of changes in the center position of the load. The configuration of the touch sensor 21 thus formatted to detect the center position of a two-dimensional load distribution and the method for calculating the total load, the center position, and the sliding are well known and are disclosed in, e.g., JP-A 56-147003, JP-B 60-35602, JP-B 6-5162, JP-B 6-58239, and WO 2007/069412. The touch sensors for detecting the center position of a two-dimensional load distribution disclosed in these documents have four wires. Minimal wiring is implemented, and output calculations are also performed using a simple analog circuit, and therefore high responsiveness within 1 ms can be implemented.

Figure 4:
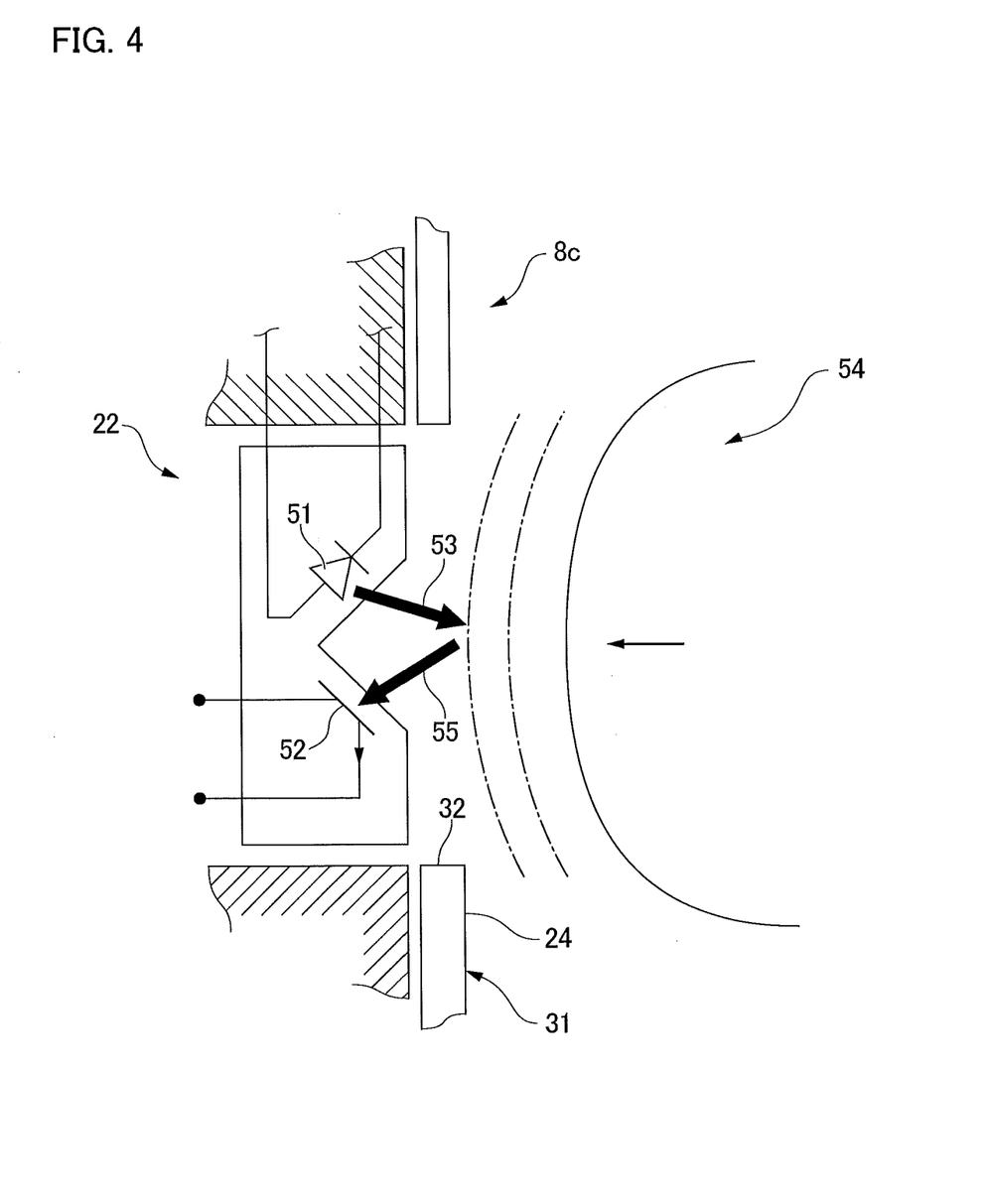
FIG. 4 is a schematic configuration diagram that shows a proximity sensor.

FIG. 4 is a descriptive diagram that shows the proximity sensor 22. The proximity sensor 22 that is composed of a reflective photosensor is provided with a light-emitting diode 51 and a photodiode 52. The light-emitting diode 51 emits a predetermined quantity of detection light 53 on the basis of a driving signal fed from the analog circuit 23. When an object 54 is positioned in the vicinity of the proximity sensor 22, the detection light 53 is reflected by the object 54. Reflected light 55 from the object 54 is detected by the photodiode 52. The photodiode 52 produces a detection current that corresponds to the amount of received light (the intensity of the reflected light). The intensity of the reflected light 55 increases as the distance between the object 54 and the photodiode 52 decreases, and therefore a detection signal that expresses the distance to the object 54 can be obtained.

The analog circuit 23 exerts controls so that the amount of detection light of the light-emitting diode 51 is constant, generates a detection signal that corresponds to the detection current obtained from the photodiode 52, and feeds this signal to the control device 4. The control device 4 can calculate the distance to the object 54 on the basis of the received detection signal.

Embodiment 2

Figure 5:
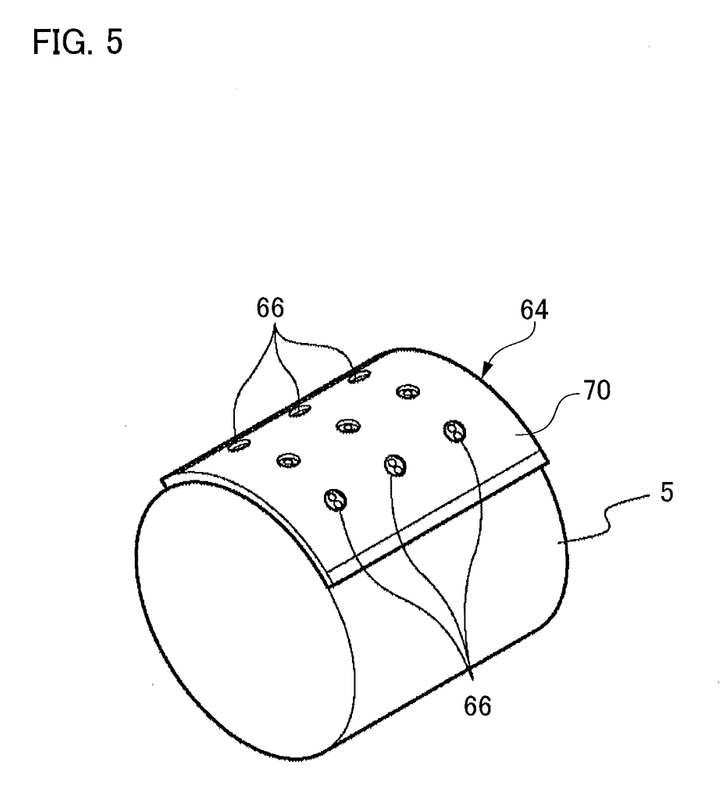
FIG. 5 is a perspective view that shows a complex sensor that can be attached to an arm part.
Figure 6:
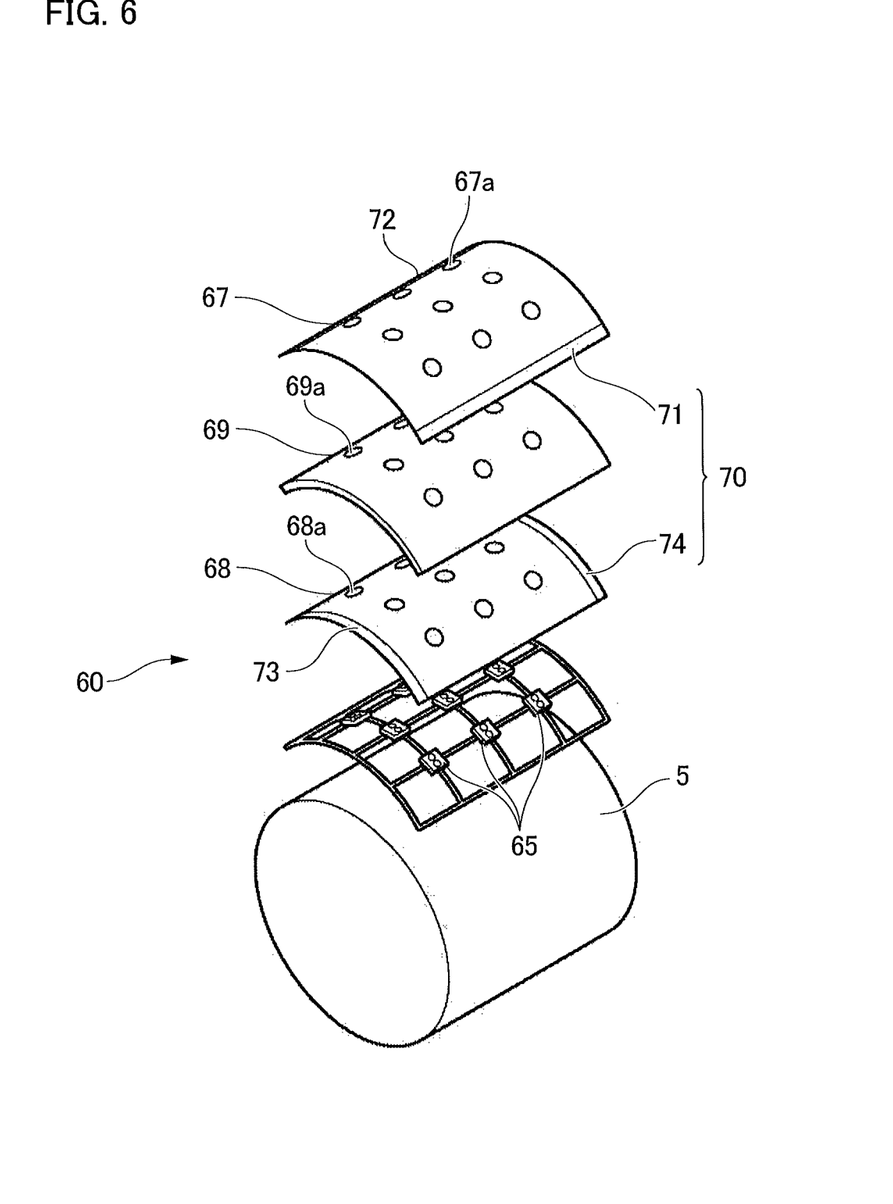
FIG. 6 is an exploded perspective view of the complex sensor of FIG. 5.

FIG. 5 is a perspective view that shows a complex sensor according to Embodiment 2. FIG. 6 is an exploded perspective view thereof.

A complex sensor 60 according to the present Embodiment 2 can be mounted on the arm part 5 of the robot hand 2 of Embodiment 1. The arm part 5 of the robot hand 2 corresponds to the arm of a human and is a portion that does not contact an object when the robot hand 2 grasps the object. The complex sensor 60 is attached to a circular external circumferential portion of the cylindrical arm part 5.

Like the aforedescribed complex sensor 20, the complex sensor 60 is provided with a touch sensor 64 that detects the center position of a two-dimensional load distribution, and mesh-form proximity sensors 65 that are composed of reflective photosensors. The touch sensor 64 is provided with a pressure-sensitive sheet 70. A surface of the arm part 5 that is covered by the pressure-sensitive sheet 70 acts as the detection surface. A plurality of circular through holes 66 are formed in a matrix in the pressure-sensitive sheet 70. The mesh-form proximity sensors 65 are positioned in a matrix at positions corresponding to the through holes 66 on the external circumferential portion of the cylindrical portion that is covered by the pressure-sensitive sheet 70 on the arm part 5. The sensing surfaces of the mesh-form proximity sensors 65 are exposed to the outside by the through holes 66.

The pressure-sensitive sheet 70 of the touch sensor 64 is formed as in the touch sensor 21. Specifically, the pressure-sensitive sheet is formed from a conductive film 67 (front surface film), a conductive film 68 (rear surface film), and a pressure-sensitive conductive rubber 69 (intermediate film), as shown in FIG. 6. The conductive film 67 is rectangular and is formed from a flexible, conductive material. The conductive film 68 is formed from the same material as the conductive film 67 and has substantially the same shape as the conductive film 67. The pressure-sensitive conductive rubber 69 is formed from an elastic material provided with a predetermined electrical conductivity and has substantially the same rectangular shape as the conductive film 67.

The pressure-sensitive conductive rubber 69 is layered between the conductive film 67 and the conductive film 68 so that the corresponding edges of their rectangular shape are mutually overlaid. The pressure-sensitive conductive rubber 69 is also electrically connected to the conductive film 67 and the conductive film 68. When a load is applied to the touch sensor 64, the pressure-sensitive conductive rubber 69 elastically deforms in the thickness direction at the portion on which the load acts. When the pressure-sensitive conductive rubber 69 elastically deforms, the resistance provided between the conductive film 67 and the conductive film 68 changes. Through holes 67a, 68a, 69a that constitute each of the through holes 66 are respectively formed at corresponding regions in the films 67, 68 and the rubber 69.

First through fourth electrode terminals 71 through 74 are provided to the pressure-sensitive sheet 70 of the touch sensor 64. The first electrode terminal 71 is formed on an edge portion along one of the rectangular long sides of the conductive film 67 and is electrically connected to the analog circuit 23 shown in FIG. 1 via electrical wiring (not shown). The second electrode terminal 72 is formed on an edge portion along the other rectangular long side of the conductive film 67 and is also electrically connected to the analog circuit 23 via electrical wiring. The third electrode terminal 73 is formed on an edge portion along one of the rectangular short sides of the conductive film 68 and is electrically connected to the analog circuit 23 via electrical wiring. The fourth electrode terminal 74 is formed on an edge portion along the other rectangular short side of the conductive film 68 and is electrically connected to the analog circuit 23 via electrical wiring.

When a predetermined voltage is applied between the first and second terminal electrodes 71, 72 and the third and fourth terminal electrodes 73, 74 in the touch sensor 64 having this configuration, an electrical current that corresponds to the load acting on the pressure-sensitive sheet 70 of the touch sensor 64 flows to the first and second terminal electrodes 71, 72 and the third and fourth terminal electrodes 73, 74.

In the analog circuit 23, a predetermined voltage is applied to the first and second terminal electrodes 71, 72 and the third and fourth terminal electrodes 73, 74. The electrical current that flows to the first through fourth electrode terminals 71 through 74 is measured, and the measurement results are outputted to the control device 4. The control device 4 calculates the total amount of the load applied to the touch sensor 64 and the center position of that load on the basis of the electrical current. The center position represents a weighted average obtained using the plurality of positions at which a plurality of loads are applied to the touch sensor 64 weighted according to the loads. The control device 4 also detects sliding of the object 54 contacting the touch sensor 64 on the basis of changes in the center position of the loads.

The mesh-form proximity sensors 65 comprise a plurality of proximity sensors that are composed of reflective photosensors. The sensing surfaces of the mesh-form proximity sensors 65 are exposed to the outside through the plurality of the through holes 66 that are formed in a matrix on the pressure-sensitive sheet 70. The mesh-form proximity sensors 65 are each configured as the proximity sensor 22.

(Operations of the Robot Hand)

The operations of the robot-hand system 1 thus configured include an operation for assuming a grasping position in order to grasp the object 54, an operation for bringing the fingertip parts 8c into adequate proximity with the object 54 to be grasped, and an operation for grasping the object 54 to be grasped.

In the operation for assuming a grasping position, the control device 4 first uses the proximity sensors 22, 65 to measure the distance between the graspable object and the robot hand 2. The control device 4 controls the driving of the actuators 11 through 15 of the robot hand 2 on the basis of the measured distance so that the fingertip parts 8c approach the graspable object 54 to a distance within several centimeters.

In the operation for bringing the fingertip parts 8c into adequate proximity with the graspable object 54, the control device 4 uses the proximity sensors 22 to measure the distance between the graspable object 54 and the fingertip parts 8c of the robot hand 2. The control device 4 controls the driving of the actuators 11 through 15 of the robot hand 2 on the basis of the measured distance so that the fingertip parts 8c contact the graspable object 54. At this time the control device 4 controls the driving of the actuators 11 through 15 of the robot hand 2 so that the relative speeds of the graspable object 54 and the fingertip parts 8c converge at zero at the moment of contact between the graspable object 54 and the fingertip parts 8c.

In the operation for grasping the object 54, the control device 4 uses the touch sensors 21 to detect the total amount of load and the center positions of the loads applied to the detection surfaces 24 of the fingertip parts 8c from the graspable object 54. The control device 4 controls the driving of the actuators 11 through 15 of the robot hand 2 so that appropriate loads are applied to the fingertip parts 8c.

Once the robot hand 2 has grasped the graspable object 54, the control device 4 controls the driving of the actuators 11 through 15 of the robot hand 2 so that the graspable object 54 moves to the target position. The control device 4 in this case uses the touch sensors 21 to detect sliding between the graspable object 54 and the fingertip parts 8c. A more appropriate load is calculated on the basis of this sliding. The driving of the actuators 11 through 15 of the robot hand 2 is controlled so that the calculated appropriate load is applied to the fingertip parts 8c.

Operational Effects of the Embodiments

The robot-hand system 1 is provided with the complex sensors 20, 60 that are composed of an assembly of the touch sensors 21, 64 and the proximity sensors 22, 65, as described above, and therefore proximity information and contact information can both be acquired for the graspable object 54. The operations from the approach to the object 54 to the grasping of the object 54 can therefore be seamlessly and smoothly implemented.

The robot-hand system 1 can also more appropriately grasp the graspable object 54. Specifically, the robot-hand system 1 causes the relative speeds of the graspable object 54 and the fingertip parts 8c to converge at zero at the moment of contact between the graspable object 54 and the fingertip parts 8c, whereby the impact force applied to the graspable object 54 can be reduced, and the graspable object 54 can be gently grasped without displacement, deformation, or damage. The robot-hand system 1 can, e.g., grasp a vertically positioned pencil without knocking the pencil over and can support a human without causing pain. The robot-hand system 1 controls the driving of the actuators 11 through 15 of the robot hand 2 so that the contact force is turned aside when supporting a graspable object that may topple over.

The robot-hand system 1 grasps the graspable object 54 using a load calculated on the basis of sliding, whereby the graspable object 54 can be continually grasped using the minimal grasping force at which slipping does not occur.

When the robot-hand system 1 is moving the graspable object 54, and inertial force is applied to the graspable object 54 due to the acceleration, vibration, or the like accompanying the movement, and slipping occurs, the robot-hand system can, e.g., increase the grasping force and control the minimum grasping force at which slipping does not occur in dynamic environments.

The sensors used for such operations are different from those used in various other operations. The robot-hand system 1 therefore allows the sensors used in various other operations to be switched in. The amount of information that the control device 4 handles can be lessened in this manner, and processing time can also be shortened.

The methods in which visual sensors are used as described above are generally used for acquiring information before contact. Vision has problems of occlusion (concealment due to the object) and blind spots, and placing a visual sensor to cover everything is difficult. Vision is imaged using a video camera, but the response rate is typically approximately 30 frames per second. The robot-hand system 1 can measure the positional relationship between the robot hand 2 and the object to be grasped in a more instantaneous fashion than these visual sensors, and therefore the object to be grasped can be seized more quickly and in a gentle but definite manner, without impact. In other words, the touch sensor according to the present invention is appropriate for use as cutaneous sensation of a robot.

The touch sensor according to the present invention can also be used in arm robots for scooping up objects. The arm robot in such instances can smoothly perform operations leading to contact with the object, as in the case of the fingertip. Such an arm robot can gently and safely execute operations exemplified by carrying or supporting an object and can implement the human interactions needed for service robots.

The robot-hand system 1 can also be further provided with a vision sensor for taking images of the graspable object. The robot-hand system 1 in such instances uses the images for examining the graspable object and until making a global approach, and uses proximity and touch senses for the local approach and for capturing and grasping, whereby image processing and other software burdens can be lessened.

(Effect of Through Holes on Measurement Accuracy of Touch Sensor)

Figure 7:
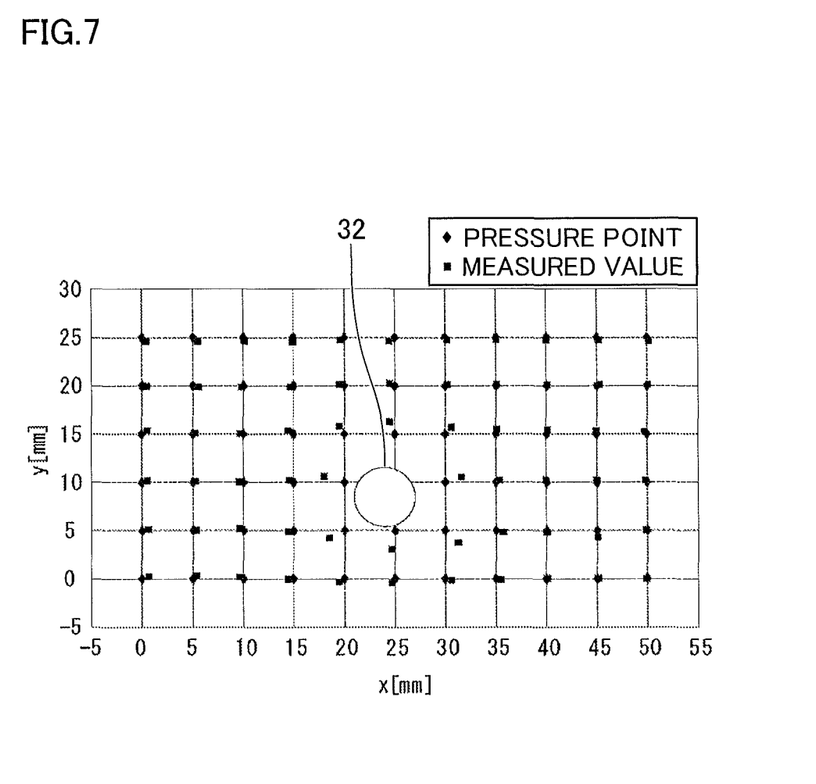
FIG. 7 is a graph that shows measurement results that show the effects on detection accuracy due to the through hole in the contact sensor.

FIG. 7 shows an example of measurement results of the center position of a load provided to the touch sensor 21. The measurements were performed by the present inventors. The measurement results demonstrate that, even though through holes are formed, measurement error is still suitably small, and the touch sensor 21 has the accuracy necessary for the robot hand 2 to grasp a graspable object. The measurement results also demonstrate that the error between the position of the pressure point provided by the load and the position of the measured pressure point increases when the pressure point is closer to the through holes, and decreases when the pressure point is farther from the through holes.

According to the measurements of the present inventors, it was confirmed that the touch sensor 21 can detect at a predetermined accuracy the total amount of load and the center position of a two-dimensionally distributed load, even when the through holes are formed.

According to other measurements, the maximum error value decreases as the size of the through holes decreases. According to still other measurements, the maximum value of the measurement error decreases to the extent that the plurality of through holes are uniformly scattered. Appropriately designing the dimensions and positions of the through holes therefore allows the touch sensors 21, 64 to maintain a desired detection accuracy.

The shape of the through holes may be circular, or triangular, square, or another polygonal shape. Other desired shapes are also possible.

Other Embodiments

Other detection-format proximity sensors for detecting the proximity of an object can be used instead of the proximity sensors 22, 65; e.g., an ultrasound sensor can be used as the proximity sensor.

Sensors other than the proximity sensors 22, 65 can also be placed; e.g., sensors can be placed for detecting physical quantities other than the proximity of an object. Examples of such sensors include heat-detecting sensors and color-detecting sensors.

The plurality of the mesh-form proximity sensors 65 can also be substituted with a plurality of sensors for measuring a plurality of types of physical quantities. Touch sensors applicable for such sensors can detect these physical quantities as well as the load.

The through holes 32, 66 can also be used to expose regions other than sensors; e.g., screws, connectors, protrusions, and the like can be exposed. In the case of screw holes for exposing screws, the holes are used for receiving the entry of the screws in order to anchor components to the fingertip part 8c or the arm part 5 covered by the touch sensors 21, 64. In the case of connectors, holes are used to transmit information or energy between an external device and the fingertip part 8c or the arm part 5 covered by the touch sensors 21, 64. In the case of protrusions, holes are formed to improve the design of the device covered by the touch sensors 21, 64. Protrusions from the through holes of the touch sensors 21, 64 are made to extend to the outside, whereby the pressure sensitive sheet can be prevented from rising off the surface, breakage can be prevented, and other effects can be obtained.

The aforedescribed examples involve attaching the complex sensor of the present invention to an object-grasping surface of a robot hand or to an arm, but the complex sensor of the present invention can also be used on regions other than robot hands and arms. The complex sensor of the present invention can also be used in worktables or other mechanisms for handling various objects.

The invention claimed is:

1. A complex sensor, comprising:
a sensor-mounting component;
a detection surface;
a touch sensor mounted on the sensor-mounting component and provided with a pressure-sensitive sheet for detecting contact of an object with the detection surface
an auxiliary sensor mounted on the sensor-mounting component,
the detection surface is defined by a surface of the pressure-sensitive sheet of the touch sensor;
a sheet-removal part formed by cutting through a part of the pressure-sensitive sheet in a thickness direction; and
a sensing surface of the auxiliary sensor being exposed outside the detection surface via the sheet-removal part.

2. The complex sensor according to claim 1, wherein the pressure-sensitive sheet of the touch sensor comprises:
a front surface film comprising a flexible, electrically conductive material;
a rear surface film comprising a flexible, electrically conductive material;
an intermediate film sandwiched between the front surface film and the rear surface film in an electrically conductive state and comprising a flexible, pressure-sensitive, electrically conducting material, conductance characteristics thereof changing according to a magnitude of a load applied in the thickness direction;
a first electrode terminal and a second electrode terminal formed on both ends of the front surface film in a planar direction; and
a third electrode terminal and a fourth electrode terminal formed on both ends of the rear surface film in the planar direction, wherein
at least one of the magnitude of the load applied to the detection surface and a position of a center of gravity of the load can be detected on the basis of a terminal voltage obtained from the first through fourth electrode terminals in a state in which a predetermined difference in electrical potential is maintained between the front surface film and the rear surface film sandwiching the intermediate film.

3. The complex sensor according to claim 2, wherein the auxiliary sensor is a proximity sensor for detecting proximity of the object to the detection surface of the sensor-mounting component.

4. The complex sensor according to claim 3, wherein the sheet-removal part is a through hole formed in the pressure-sensitive sheet.

5. The complex sensor according to claim 3, comprising:
a second sheet-removal part formed on the pressure-sensitive sheet in a position different from the sheet-removal part, wherein
a region other than the sensing surface of the auxiliary sensor is exposed via the second sheet-removal part.

6. The complex sensor according to claim 3, comprising:
a plurality of auxiliary sensors of the same type or different types, the plurality of auxiliary sensors acting as the auxiliary sensor, wherein
the sheet-removal part is formed in a plurality of locations in the pressure-sensitive sheet; and
each of the sheet-removal parts exposes the sensing surface of one or a plurality of the auxiliary sensors.

7. The complex sensor according to claim 2, wherein
the auxiliary sensor detects optical characteristics, temperature characteristics, or other properties of an object in proximity to the detection surface or an object in contact with the detection surface.

8. The complex sensor according to claim 7, wherein
the sheet-removal part is a through hole formed in the pressure-sensitive sheet.

9. The complex sensor according to claim 7, comprising:
a second sheet-removal part formed on the pressure-sensitive sheet in a position different from the sheet-removal part, wherein
a region other than the sensing surface of the auxiliary sensor is exposed via the second sheet-removal part.

10. The complex sensor according to claim 7, comprising:
a plurality of auxiliary sensors of the same type or different types, the plurality of auxiliary sensors acting as the auxiliary sensor, wherein
the sheet-removal part is formed in a plurality of locations in the pressure-sensitive sheet; and
each of the sheet-removal parts exposes the sensing surface of one or a plurality of the auxiliary sensors.

11. A robot hand, comprising:
a finger mechanism provided with an object-grasping surface; and
the complex sensor according to claim 7, wherein
at least a part of the object-grasping surface is delimited by the detection surface of the complex sensor.

12. The robot hand according to claim 11, wherein
the finger mechanism comprises a finger-base part and a fingertip part, the fingertip part being linked to a distal end of the finger-base part via a joint part, wherein
a fingertip surface portion of the fingertip part is at least the object-grasping surface; and
the fingertip surface portion is delimited by the detection surface of the complex sensor.

13. A robot having an arm provided with an object-detecting surface comprising:
the complex sensor according to claim 7, wherein
at least a part of the object-detecting surface of the arm is delimited by the detection surface of the complex sensor.

14. A robot hand, comprising:
a finger mechanism provided with an object-grasping surface; and
the complex sensor according to claim 1, wherein
at least a part of the object-grasping surface is delimited by the detection surface of the complex sensor.

15. The robot hand according to claim 14, wherein
the finger mechanism comprises a finger-base part and a fingertip part, the fingertip part being linked to a distal end of the finger-base part via a joint part, wherein
a fingertip surface portion of the fingertip part is at least the object-grasping surface; and
the fingertip surface portion is delimited by the detection surface of the complex sensor.

16. A robot having an arm provided with an object-detecting surface, comprising:
the complex sensor according to claim 1, wherein
at least a part of the object-detecting surface of the arm is delimited by the detection surface of the complex sensor.

17. The complex sensor according to claim 1, wherein
the auxiliary sensor is a proximity sensor for detecting proximity of the object to the detection surface of the sensor-mounting component.

18. A robot hand having a finger mechanism provided with an object-grasping surface; wherein:
the complex sensor according to claim 17, wherein
at least a part of the object-grasping surface is delimited by the detection surface of the complex sensor.

19. The robot hand according to claim 18, comprising:
the finger mechanism comprises a finger-base part and a fingertip part, the fingertip part being linked to a distal end of the finger-base part via a joint part, wherein
a fingertip surface portion of the fingertip part is at least the object-grasping surface; and
the fingertip surface portion is delimited by the detection surface of the complex sensor.

20. A robot having an arm provided with an object-detecting surface, comprising:
the complex sensor according to claim 17, wherein
at least a part of the object-detecting surface of the arm is delimited by the detection surface of the complex sensor.

21. The complex sensor according to claim 1, wherein
the auxiliary sensor detects optical characteristics, temperature characteristics, or other properties of an object in proximity to the detection surface or an object in contact with the detection surface.

22. The complex sensor according to claim 1, wherein
the sheet-removal part is a through hole formed in the pressure-sensitive sheet.

23. The complex sensor according to claim 1, comprising:
a second sheet-removal part formed on the pressure-sensitive sheet in a position different from the sheet-removal part, wherein
a region other than the sensing surface of the auxiliary sensor is exposed via the second sheet-removal part.

24. The complex sensor according to claim 1, comprising:
a plurality of auxiliary sensors of the same type or different types, the plurality of auxiliary sensors acting as the auxiliary sensor, wherein
the sheet-removal part is formed in a plurality of locations in the pressure-sensitive sheet; and
each of the sheet-removal parts exposes the sensing surface of one or a plurality of the auxiliary sensors.

* * * * *